R. A. MERRILL.
CHUCK.
APPLICATION FILED JAN. 26, 1910.
1,071,940.
Patented Sept. 2, 1913.
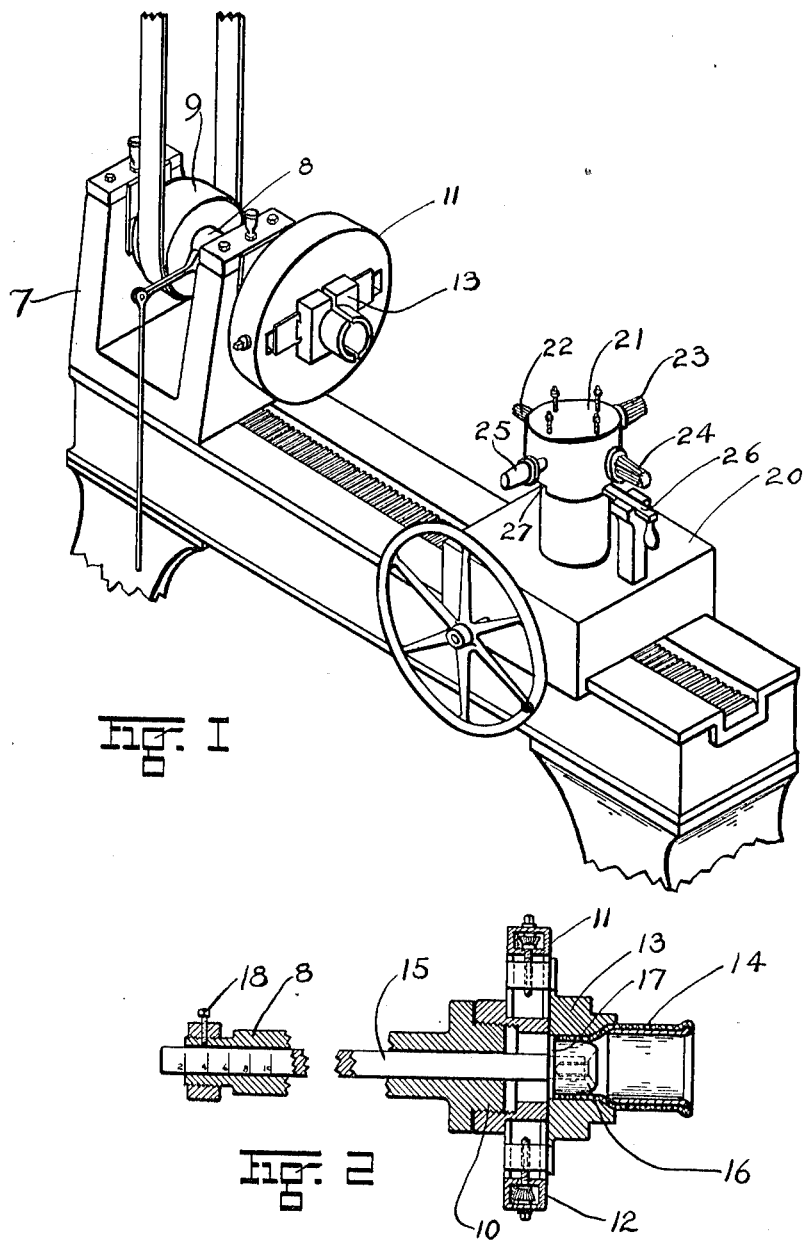

UNITED STATES PATENT OFFICE.

ROBERT A. MERRILL, OF CINCINNATI, OHIO.

CHUCK.

1,071,940.  Specification of Letters Patent.  Patented Sept. 2, 1913.

Application filed January 26, 1910. Serial No. 540,107.

*To all whom it may concern:*

Be it known that I, ROBERT A. MERRILL, a citizen of the United States of America, and resident of Cincinnati, Hamilton county, State of Ohio, have invented certain new and useful Improvements in Chucks, of which the following is a specification.

This invention relates to apparatus for manufacturing plumbers' ferrules, and particularly to means for holding a pipe section, or the material operated upon, during the operation of forming the ferrule.

An object of this invention is to produce means for securely holding pipe sections of varying sizes and lengths during the operation of manufacturing ferrules. These and other objects I attain by means of the apparatus illustrated in the drawings accompanying this application and forming a part thereof.

In the drawings, Figure 1 is a perspective view of a machine equipped with an embodiment of my invention. Fig. 2 is a longitudinal section of a spindle and a chuck, which forms an embodiment of my invention. A portion of the spindle is shown broken away for the convenience of illustration.

The apparatus illustrated in Fig. 1 is similar in many respects to an ordinary lathe and is employed for manufacturing plumbers' ferrules. It is provided with a head stock 7, in which the hollow spindle 8 is journaled. A belt driven pulley 9 is mounted on the spindle, and the spindle is threaded at its inner end 10 to receive a chuck 11, as illustrated in Fig. 2. The chuck 11 is adapted to be utilized with the apparatus of Fig. 1 in manufacturing straight ferrules, and consists of a head 12, on which movable jaws 13 are mounted. The jaws 13 are located in radial ways, formed in the head, and are adjusted by means of bolts, which project beyond the peripheral face of the chuck. The jaws 13 are adapted to clamp a section of lead pipe 14 and to hold it during the several operations of manufacturing a ferrule.

The spindle 8 is provided with a longitudinally extending and centrally located square hole, in which a graduated square rod or gage bar 15 is slidably mounted. One end of the rod is turned down to receive a center stop 16, which is provided with a collar 17, and is secured to the rod in any suitable manner, as by means of a counter-sunk screw. The rod is secured in place by means of a set screw 18, which projects through the spindle 8. The inner end of the section of pipe, clamped by the jaws 13, is centered by means of the center stop 16 and abuts against the collar 17. The stop piece 16 is adjustable longitudinally of the clamp 13, for the purpose of adjusting the chuck to receive different lengths of pipe. Different sized center stops may be secured in place on the rod 15 to accommodate the chuck to pipes of different diameters.

The apparatus illustrated in Fig. 1 is provided with a tail stock 20, on which a turret 21 is rotatively mounted. Radially projecting tools 22, 23, 24 and 25 are so mounted on the turret that they may be brought into engagement with the pipe section clamped in place by the jaws 13 of the chuck. A latch 26 is mounted on the tail stock and is adapted to engage one of a number of recesses 27 provided on the turret, for the purpose of preventing the turret from turning, while one of the tools secured to it is in the operative position.

What I claim is:

1. A chuck for holding pipe, consisting of a head provided with a central opening, an adjustable gage bar projecting into the opening, a stop-piece mounted on the gage bar and having a center stop for projecting into the pipe and a collar for engaging the end of the pipe, and jaws mounted on the head and coöperating with said stop-piece in locking a pipe in place.

2. A chuck for holding a pipe to be operated upon, consisting of a head provided with a central opening, a longitudinally shiftable gage bar projecting into said opening, a stop-piece removably mounted on the bar and having a center stop for pipe and a collar at the inner end of the center stop for engaging the end of the pipe, and jaws mounted on the head and coöperating with the stop-piece in locking a pipe in place.

3. A chuck for holding a pipe, consisting of a head provided with a central opening, a graduated gage bar reciprocally mounted on the head and capable of moving longitudinally through the opening in the head, a stop-piece removably secured to the gage bar and having a pipe center stop and a collar at the inner end of the center stop, jaws mounted on the head for coöperating with the stop-piece to hold the pipe in place, and means for locking the gage bar in position to hold the stop-piece in place.

ROBERT A. MERRILL.

Witnesses:
  E. M. McCallister,
  Walter F. Murray.